United States Patent
Lee et al.

(10) Patent No.: US 6,430,369 B2
(45) Date of Patent: Aug. 6, 2002

(54) ZOOM CAMERA WITH AUTOMATIC POWER-SHUTOFF FUNCTION AND THE AUTOMATIC POWER-SHUTOFF METHOD THEREOF

(75) Inventors: Jin-Gi Lee; Sang-Do Kim, both of Changwon (KR)

(73) Assignee: Samsung Techwin Co., Ltd., Kyungsangnam-do (KR)

( * ) Notice: Subject to any disclaimer, the term of this patent is extended or adjusted under 35 U.S.C. 154(b) by 0 days.

(21) Appl. No.: 09/814,695

(22) Filed: Mar. 23, 2001

(30) Foreign Application Priority Data

Mar. 31, 2000 (KR) .............................................. 00-17007

(51) Int. Cl.[7] .............................. G03B 5/00; G03B 17/04
(52) U.S. Cl. ...................... 396/87; 396/302; 396/349; 396/448
(58) Field of Search ............................ 396/87, 85, 349, 396/448, 302, 301

(56) References Cited

U.S. PATENT DOCUMENTS 5,309,195 A * 5/1994 Goo et al. .................. 396/302
5,826,118 A * 10/1998 Koga et al. ................. 396/87

FOREIGN PATENT DOCUMENTS

JP          402070179 A   *  3/1990    .......... H04N/5/225

* cited by examiner

Primary Examiner—W. B. Perkey
(74) Attorney, Agent, or Firm—Finnegan, Henderson, Farabow, Garrett & Dunner, L.L.P.

(57) ABSTRACT

The present invention relates to a zoom camera with an automatic power-shutoff function, that includes a motor including a zoom motor, a focal-distance-recognizing unit for outputting a signal corresponding to a focal distance, and a controller for positioning a body tube in a wide-angle position in the case when the camera has not operated during a first stop-time period and shuts off power if the camera has not operated during a second stop-time period, wherein it becomes possible to protect the body tube from an external impact by positioning the body tube in the wide-angle position during the first stop-time period and to take a photograph instantly when he sees a subject by eliminating the time required for turning the power on again.

5 Claims, 2 Drawing Sheets

ZOOM CAMERA WITH AUTOMATIC POWER-SHUTOFF FUNCTION AND THE AUTOMATIC POWER-SHUTOFF METHOD THEREOF

BACKGROUND OF THE INVENTION (a) Field of the Invention

The present invention relates to a zoom camera, and more particularly to a zoom camera with an automatic power-shutoff function and the automatic power-shutoff method thereof.

(b) Description of the Related Art

In a general zoom camera, power is shut off after a lens cap is closed and a body tube is retracted into the camera, and when all switches of the camera do not operate during a predetermined time period, in order to prevent damage to the body tube by external impact when the body tube is extended to a telephoto position.

Accordingly, it is impossible to instantly take a photograph when a user sees a subject, since the user must operate a power switch to prepare the camara to a ready state and select a desired photographing mode.

Therefore, in such a related art zoom camera, there are problems in that the body tube may be damaged by an external impact caused within a predetermined time period, and it is impossible to take a quick photograph of a momentarily-seen subject since the lens cap is closed and the body tube is retracted into the camera, and it is automatically turned off after the predetermined time period has elapsed.

SUMMARY OF THE INVENTION

Therefore, the present invention is derived to resolve the above disadvantages and problems of the related art and has an object to provide a zoom camera with an automatic power-shutoff function and the automatic power-shutoff method thereof, in which it is possible to protect a body tube within a predetermined time period and take a photograph of a subject instantly.

According to the present invention, if the zoom camera has not operated until a first stop-time period has elapsed, a body tube comes into a wide-angle state. Thereafter, if the zoom camera has not operated until a second stop-time period has elapsed, a lens cap is closed and the body tube is put in a closed position for shutting off power.

According to one aspect of the present invention, the zoom camera with an automatic power-shutoff function as above includes a power supply, a body tube-moving unit, a body tube position detector, a controller, and a switch.

The power supply supplies power required for operating the camera, the body tube-moving unit drives a body tube to move, and the body tube position detector detects a position of the body tube.

The controller analyzes a signal output from the body tube position detector and moves the body tube toward a wide-angle position by operating the body tube-moving unit, if the body tube is not in the wide-angle position and all switches of the camera have not operated during the first stop-time period after a previous operation of the camera. Further, the controller puts the body tube in a closed position by operating the body tube-moving unit again and shuts off the power in the case all switches of the camera have not operated during the second stop-time period after the first stop-time period.

The switch includes a power switch for turning the power supply on and off.

At this time, the controller maintains a current photographing mode and a photographing preparation state before the second stop-time period elapses, and operates the body tube again for closing the lens cap and putting the body tube in the closed position if the camera does not operate during the second stop-time period.

According to another aspect of the present invention, a method for automatically shutting off power of a zoom camera with an automatic power-shutoff function includes a first step of supplying power from a power supply by turning on a power switch; a second step of determining whether all switches of the camera have not operated during a first stop-time period; a third step of determining whether a current position of the body tube is in a wide-angle position through the body tube position detector; a fourth step of positioning the body tube in the wide-angle position by driving a zoom motor of the body tube-moving unit if the controller determines that the first stop-time period has elapsed without any operations of the camera; a fifth step of determining whether all switches of the camera have not operated during a second stop-time period if the controller determines that the body tube is not in the wide-angle position; and a sixth step of putting the body tube in a closed position; and thereafter shutting off the power if the controller determines that the camera has not operated during the second stop-time period, wherein if any operation of the camera is sensed by the controller in the second stop-time period, it is checked again whether the first stop-time period has elapsed or not.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

The present invention will be explained in more detail with reference to preferred embodiments in conjunction with the attached drawings.

Figure 1:
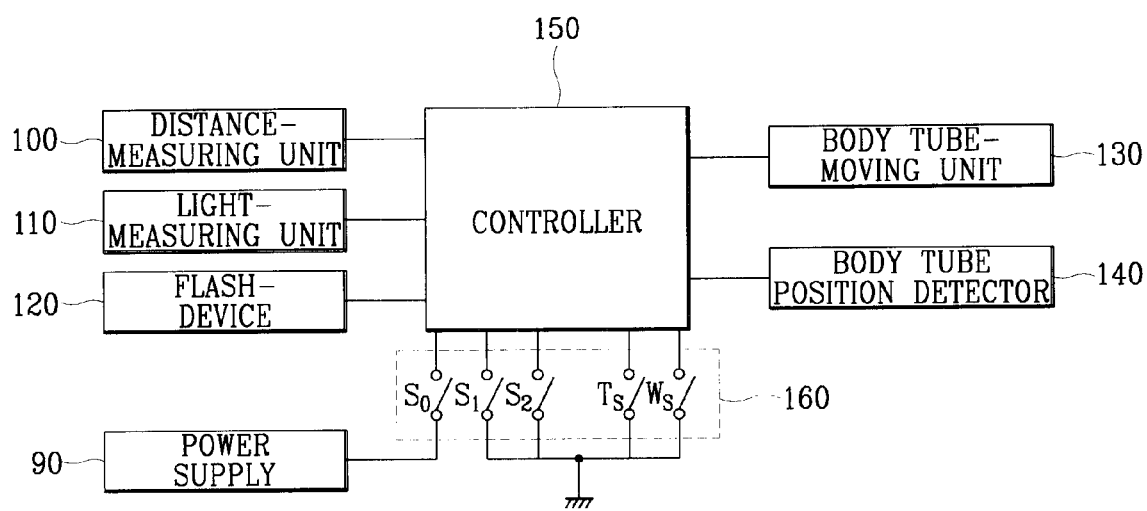
FIG. 1 is a block diagram of a zoom camera with an automatic power-shutoff function according to a preferred embodiment of the present invention.

FIG. 1 is a block diagram of a zoom camera with an automatic power-shutoff function according to a preferred embodiment of the present invention.

As shown in FIG. 1, the zoom camera with an automatic power-shutoff function according to the present invention includes a power supply 90, a distance-measuring unit 100, a light-measuring unit 110, a flash device 120, a body tube-moving unit 130, a body tube position detector 140, a controller 150, and a switch 160.

The power supply 90 supplies power required for operating the camera, the distance-measuring unit 100 measures a distance from the camera to a subject for photography, the light-measuring unit 110 measures brightness when photographing the subject, and the flash device 120 supplements the intensity of light radiation if the intensity of light radiation is insufficient when photographing the subject.

The body tube-moving unit 130 includes a zoom motor for moving the body tube from a closed position to a telephoto position, and the body tube position detector 140 outputs a signal corresponding to a focal distance which is changeable according to the position of the body tube.

The controller 150 moves the body tube to a wide-angle position that is a photographing preparation state, by operating the zoom motor of the body tube-moving unit 130 in the case the camera has not operated during a first stop-time period. If the camera has not operated during a second stop-time period, the controller 150 puts the body tube in the closed position after closing a lens cap by operating the zoom motor of the body tube-moving unit 130 again, and thereafter shuts off the power if the camera has not operated. Here, the lens cap is an optional feature, and hence, if the lens cap is not provided, the process of closing the lens cap is not needed. The first stop-time period is a predetermined time period in which the camera does not operate after the previous operation of the camera, and the second stop-time period is a predetermined time period during which the camera does not operate after the first stop-time period.

The switch 160 includes a switch S0 for turning on/off the power supply 90, a release first-step switch S1 for outputting a signal to the controller 150 for measuring a distance from the subject and an exposure amount through the distance-measuring unit 100 and the light-measuring unit 110, a release second-step switch S2 for outputting a signal to the controller 150 for operating a shutter if the distance measuring and the light measuring are accomplished, a teleswitch TS for outputting a signal to the controller 150 for moving the body tube to the telephoto position by the body tube-moving unit 130, and a wide-end switch TW for outputting a signal to the controller 150 for moving the body tube to the wide-angle position.

Figure 2:
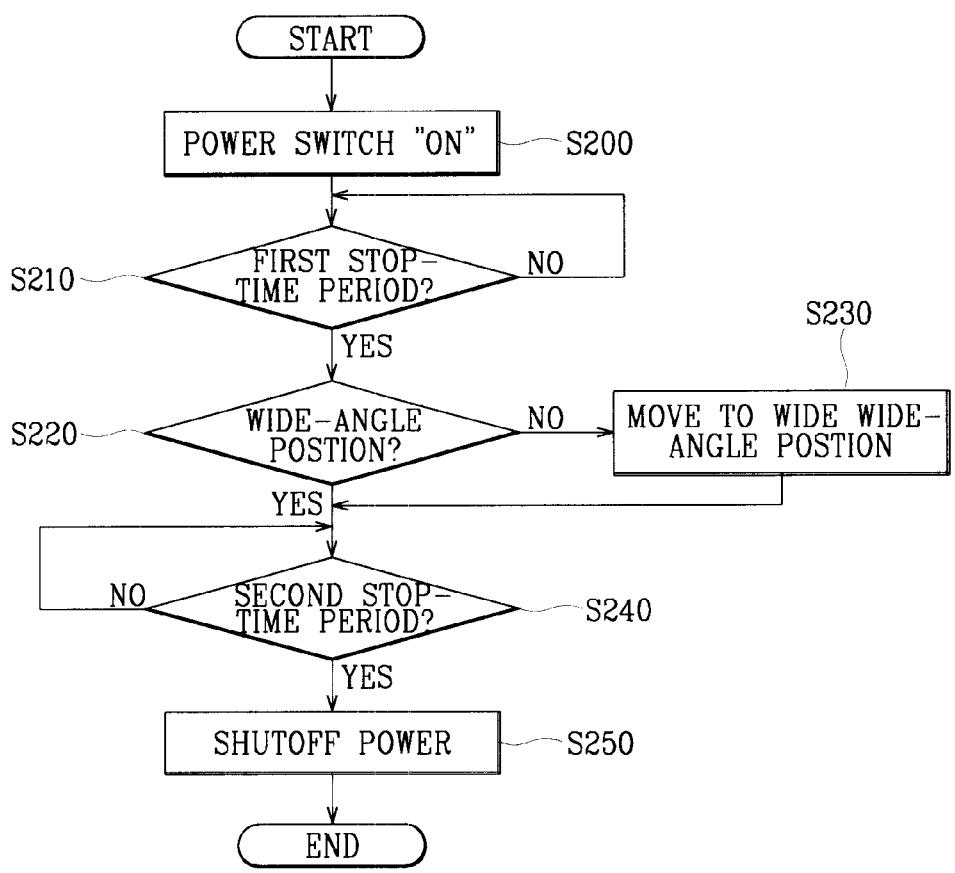
FIG. 2 is a procedural view for explaining a method for automatically shutting off power of the zoom camera with an automatic power-shutoff function according to the preferred embodiment of the present invention.

FIG. 2 is a procedural view for explaining a method for automatically shutting off power of the zoom camera with an automatic power-shutoff function according to a preferred embodiment of the present invention. The method for shutting off power according to the present invention will now be explained in conjunction with the attached FIG. 2.

As shown in FIG. 2, the method for automatically shutting off power of the zoom camera with an automatic power-shutoff function includes the steps of supplying power from the power supply by turning on the power switch (step S200), determining whether the first stop-time period is completed or not (step S210), determining whether the body tube is in a wide-angle position or not (step S220), positioning the body tube in the wide-angle position (step S230), determining whether the second stop-time period is completed (step S240), and shutting off power after the second stop-time period (step S250).

If the power is input from the power supply 90 to the camera as the power switch S0 is turned on, the controller 150 determines whether all switches of the camera have not operated during the first stop-time period after the previous operation of the camera (step S210).

The controller 150 determines whether a current position of the body tube is the wide-angle position through the body tube position detector 140, if the controller determines that all switches of the camera have not operated during the first stop-time period (S220).

The controller 150 positions the body tube in the wide-angle position by driving the zoom motor of the body tube-moving unit 130, if the controller 150 determines that the body tube is not in the wide-angle position according to the signal output from the body tube position detector 140 (S230), wherein the controller 150 maintains a current photographing mode and a state able to take a photograph from the step S210 to the step S230, so that a user can take a photograph immediately upon operating the camera.

The controller 150 determines whether all switches of the camera have not operated during the second stop-time period after positioning the body tube in the wide-angle position.

The controller 150 closes the lens cap and puts the body tube in the closed position, and thereafter shuts off the power by turning off the power switch S0, if the controller 150 determines that the camera has not operated during the second stop-time period. Here, the lens cap is an optional feature, and hence, if the lens cap is not provided, the process of closing the lens cap is not needed.

As described above, in the zoom camera with the automatic power-shutoff function and the automatic power-shutoff method thereof according to the present invention, it is possible to protect the body tube from an external impact by positioning the body tube in the wide-angle position while the user does not use the camera during a predetermined time period, and it is further possible for a user to take a photograph instantly when he sees a subject even after non-use of the camera during a predetermined time period, by eliminating the process of turning the power of the camera back on.

It will be apparent to those skilled in the art that various modifications and variations can be made to the device and method of the present invention without departing from the spirit and scope of the invention. The present invention covers the modifications and variations of this invention provided they come within the scope of the appended claims and their equivalents.

What is claimed is:

1. A zoom camera with an automatic power-shutoff function comprising:

a power supply for supplying power required for operating the camera;

a body tube-moving unit for moving a body tube;

a body tube position detector for detecting a position of the body tube;

a controller for analyzing a signal output from the body tube position detector to move the body tube to a wide-angle position by operating the body tube-moving unit if the body tube is not in the wide-angle position and all switches of the camera have not operated during a first stop-time period after a previous operation of the camera, and putting the body tube in a closed position by operating the body tube-moving unit again and to shut off the power if all the switches of the camera have not operated during a second stop-time period after the first stop-time period; and a switch including a power switch for turning on/off the power supply.

2. The zoom camera of claim 1, wherein the controller maintains a current photographing mode and a photographing preparation state before the second stop-time period elapses.

3. The zoom camera of claim 1, wherein the controller operates the body tube-moving unit again for closing a lens cap and putting the body tube in a closed position if the camera does not operate during the second stop-time period.

4. A method for automatically shutting off power of a zoom camera with an automatic power-shutoff function including a power supply for supplying power, a body tube-moving unit for moving a body tube, a body tube position detector for outputting a signal corresponding to a focal distance, a controller for shutting off power automatically, and a switch including a power switch, comprising:

supplying power from the power supply by turning on the power switch;

determining whether all switches of the camera have not operated during a first stop-time period;

determining whether a current position of the body tube is in a wide-angle position through the body tube position detector, if the controller determines that the first stop-time period has elapsed without any operations of the camera;

positioning the body tube in the wide-angle position by driving a zoom motor of the body tube-moving unit, if the controller determines that the body tube is not in the wide-angle position;

determining whether all switches of the camera have not operated during a second stop-time period; and putting the body tube in a closed position, and thereafter shutting off the power if the controller determines that the camera has not operated during the second stop-time period.

5. The method of claim 4, wherein the controller checks again whether the first stop-time period has elapsed if the controller senses an operation of the camera during the second stop-time period.

* * * * *